United States Patent
Rimon (10) Patent No.: US 10,950,022 B2
(45) Date of Patent: Mar. 16, 2021

(54) USING MACHINE LEARNING AND IMAGE RECOGNITION FOR AUTOMATIC RELOCATION OF CAMERA DISPLAY AREA AND SIZING OF CAMERA IMAGE

(71) Applicant: Sony Corporation, Tokyo (JP)

(72) Inventor: Noam Rimon, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 16/433,978

(22) Filed: Jun. 6, 2019

(65) Prior Publication Data

US 2020/0388060 A1    Dec. 10, 2020

(51) Int. Cl.
| | |
|---|---|
| G06T 11/60 | (2006.01) |
| G06T 7/70 | (2017.01) |
| G06T 3/40 | (2006.01) |
| G06T 3/20 | (2006.01) |
| G06K 9/62 | (2006.01) |

(52) U.S. Cl.
CPC ............ *G06T 11/60* (2013.01); *G06K 9/6215* (2013.01); *G06T 3/20* (2013.01); *G06T 3/40* (2013.01); *G06T 7/70* (2017.01); *G06T 2207/10004* (2013.01); *G06T 2207/20081* (2013.01)

(58) Field of Classification Search
CPC .. G06K 9/00664–00704; G06F 3/0481; G06F 3/04817; G06F 9/4443; G06F 3/04847; G06F 11/3664; G06F 3/012; G06F 3/0304; G06F 3/011–01; G06T 19/00; G06T 17/00; G06T 19/006; G06T 2215/16; H04N 5/272; H04N 2201/3245; A63F 13/10
See application file for complete search history.

(56) References Cited

U.S. PATENT DOCUMENTS

| | | | |
|---|---|---|---|
| 8,804,139 B1 | 8/2014 | Arora et al. | |
| 9,043,763 B2 * | 5/2015 | Ueno | G06F 40/103 717/137 |
| 9,996,890 B1 * | 6/2018 | Cinnamon | G06T 1/0007 |
| 10,063,792 B1 * | 8/2018 | Brailovskiy | H04N 7/181 |
| 10,235,720 B2 * | 3/2019 | Abraham | G06Q 40/12 |
| 2003/0174160 A1 | 9/2003 | Deutscher et al. | |

(Continued)

OTHER PUBLICATIONS

Inernational Search Report and Written Opinion dated Sep. 28, 2020 from the counterpart PCT application PCT/US20/034899.

(Continued)

*Primary Examiner* — Todd Buttram
(74) *Attorney, Agent, or Firm* — John L. Rogitz (57) ABSTRACT

Machine learning (ML) and image recognition are used to identify an area in a presentation such as a slide presentation which is not occupied by important content. Discovery is made of background images or data that is common between multiple slides, which implies that such common content is a banner or other element that is not unique to the current slide, in turn implying that it is not critical content. In this way, images from a camera sought to be overlaid on the presentation can be automatically relocated and, if desired, resized on a slide by slide basis to areas of the non-critical content. Manual adjustment can be used for reinforcement learning of ML for future slides.

18 Claims, 4 Drawing Sheets

(56) References Cited

U.S. PATENT DOCUMENTS

| | | | |
|---|---|---|---|
| 2004/0158865 A1* | 8/2004 | Kubler | H04N 21/41415 725/82 |
| 2006/0294469 A1 | 12/2006 | Sareen et al. | |
| 2009/0052749 A1 | 2/2009 | Steinberg et al. | |
| 2012/0162517 A1* | 6/2012 | Choi | H04N 21/422 348/565 |
| 2013/0179262 A1* | 7/2013 | Iwasaki | G06F 16/972 705/14.54 |
| 2014/0096006 A1 | 4/2014 | Berglund et al. | |
| 2014/0156364 A1* | 6/2014 | Zalewski | H04N 21/44012 705/14.4 |
| 2015/0121232 A1 | 4/2015 | Edwardson et al. | |
| 2016/0012852 A1* | 1/2016 | Van Den Wouwer | H04N 21/4886 386/241 |
| 2016/0142792 A1* | 5/2016 | Lee | H04N 21/23418 725/32 |
| 2018/0196787 A1 | 7/2018 | Wezorek | |
| 2019/0114662 A1* | 4/2019 | Bennion | G06Q 30/0277 |
| 2019/0244257 A1* | 8/2019 | Goldman | G06Q 30/08 |

OTHER PUBLICATIONS

Shibata et al., "Automatic Slide Generation Based on Discourse Structure Analysis", Graduate School of Information Sciense and Technology, University of Tokyo, 2005.

* cited by examiner

USING MACHINE LEARNING AND IMAGE RECOGNITION FOR AUTOMATIC RELOCATION OF CAMERA DISPLAY AREA AND SIZING OF CAMERA IMAGE

FIELD

The application relates generally to technically inventive, non-routine solutions that are necessarily rooted in computer technology and that produce concrete technical improvements. In particular, the present application relates to using machine learning and image recognition for automatic relocation of camera display area and sizing of camera image.

BACKGROUND

Camera images in conference calls often overlay a presentation, many times covering important presentation information (such as title or image).

SUMMARY

To address the above problem, machine learning (ML) and image recognition may be used to identify an area in a presentation such as a slide presentation which is not occupied by important content. This may be accomplished by discovering background images or data that is common between multiple slides, implying that such common content is a banner or other element such as a header, a footer, or template (collectively referred to herein for convenience as "banner" unless explicitly distinguished otherwise) that is not unique to the current slide and accordingly is impliedly not critical content. In this way, images from a camera sought to be overlaid on the presentation can be automatically relocated and, if desired, resized on a slide by slide basis to areas of the non-critical content. Manual adjustment can be used for reinforcement learning of ML for future slides.

Accordingly, a device includes at least one computer memory that is not a transitory signal and that in turn includes instructions executable by at least one processor to identify that content in a first area in a first slide of a computerized presentation is substantially identical to content in a second area of a second slide of the computerized presentation. The first and second areas respectively occupy substantially the same geometric region of the first and second slides. The instructions are executable to modify an image to fit within the second area of the second slide to render a modified image, and then overlay the modified image into the second area of the second slide.

The computer memory may be implemented in a slide projector or in a control device that provides content to the slide projector.

In some examples, the instructions can be executable to receive user input to alter a location at which the modified image is presented. The instructions may be further executable to enter the user input into a machine learning (ML) engine for reinforcement learning of the ML engine for presenting images in slides. The ML engine may be trained learn text as being correlated to an area in which the modified image is to be overlaid. Also, the ML engine may be trained to correlate metadata associated with the computerized presentation to identify an area in which the modified image is to be overlaid.

In example implementations, the instructions can be executable to, responsive to identifying that content in the first slide is not substantially identical to content in the second slide, minimize the image to render a minimized image. The minimized image may be overlaid onto the second slide.

In example embodiments, the instructions are executable to identify a region of a displayed slide as containing pointer light, and responsive to identifying the region of the displayed slide as containing pointer light, not overlay the modified image into an area of the slide corresponding to the region. If desired, the instructions can be executable to move overlay of the modified image on a third slide relative to the second slide and/or re-size the modified image on the third slide relative to the second slide based at least in part on content of the third slide.

In another aspect, a computerized method includes identifying at least a first area of a first computerized presentation element as being a candidate for having an image overlaid thereon. The first area is only a subset of the entire area of the first presentation element. The method includes, responsive to identifying the first area of the first computerized presentation element as being a candidate for having an image overlaid thereon, overlaying an image on the first area.

In another aspect, an apparatus includes at least one processor and at least one computer storage that includes instructions executable by the processor to discover content that is common between multiple slides, and based at least in part on discovering content that is common between multiple slides, automatically relocate, or resize, or relocate and resize at least one image from a camera on a slide by slide basis to areas of non-critical content.

The details of the present application, both as to its structure and operation, can best be understood in reference to the accompanying drawings, in which like reference numerals refer to like parts, and in which:

DETAILED DESCRIPTION

This disclosure relates generally to computer ecosystems including aspects of consumer electronics (CE) device networks such as but not limited to projector slide presentations and computer simulation networks such as computer game networks. A system herein may include server and client components, connected over a network such that data may be exchanged between the client and server components. The client components may include one or more computing devices including slide projectors, game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below.

Servers and/or gateways may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Python, Scala, Java, C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a slide projector or other display device. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Figure 1:
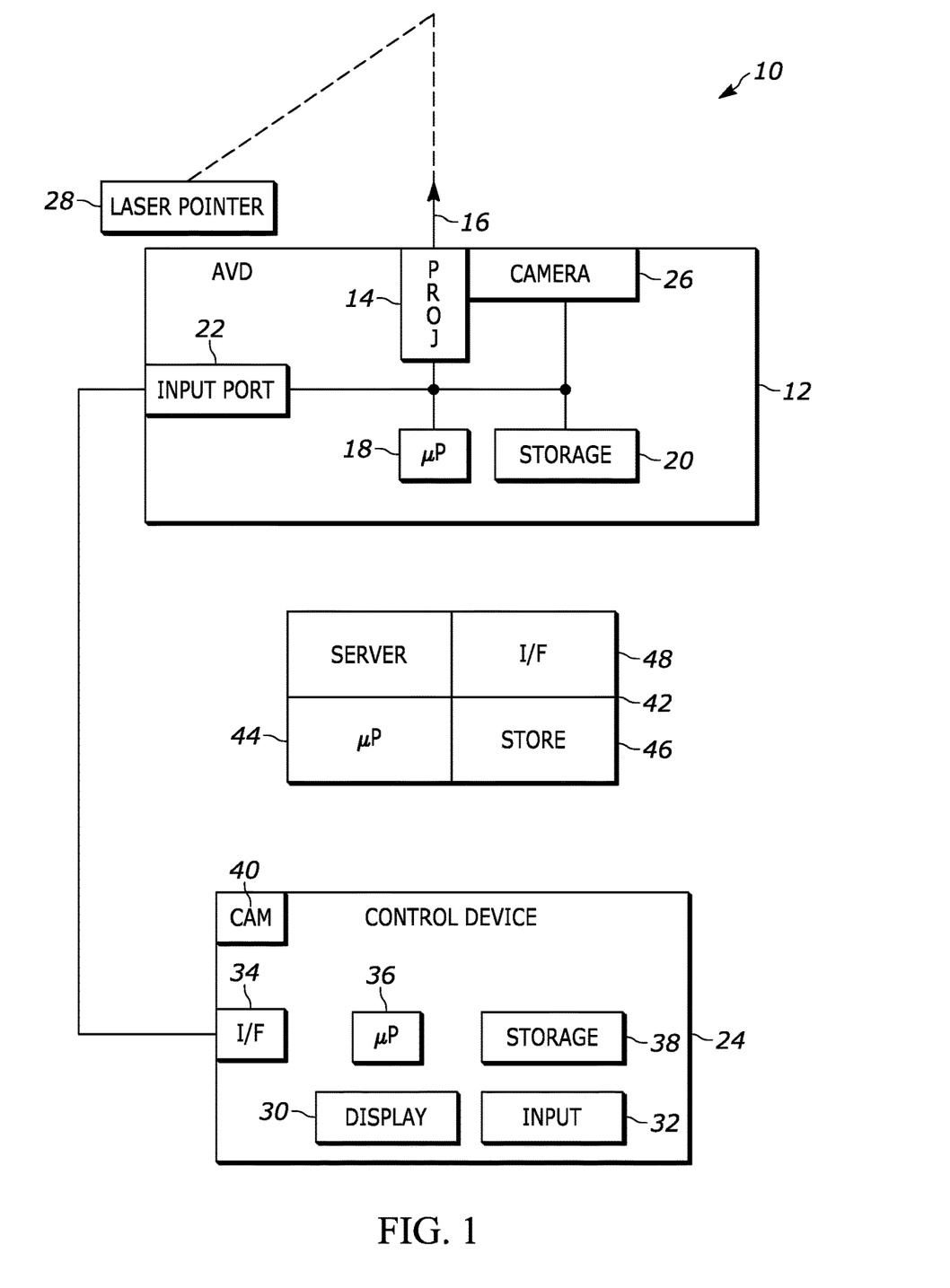
FIG. 1 is a block diagram of an example system including an example in accordance with present principles.

Accordingly, to undertake such principles the AVD 12 can be established by some or all of the components shown in FIG. 1. For example, the AVD 12 can include one or more projector lamps 14 for projecting light as indicated by the arrow 16 onto a display surface or otherwise displaying images on a display under control of one or more processors 18 accessing one or more computer storage devices 20. The example AVD 12 may also include one or more network interfaces such as an input port 22 for communication over at least one network such as the Internet, an WAN, an LAN, etc. with one or more control devices 24 such as a laptop computer, discussed further below.

Thus, the interface 22 may be, without limitation, a Wi-Fi transceiver, which is an example of a wireless computer network interface, such as but not limited to a mesh network transceiver. Furthermore, note the network interface 22 may be, e.g., a wired or wireless modem or router, or other appropriate interface such as, e.g., a wireless telephony transceiver, or Wi-Fi transceiver as mentioned above, etc. When implemented as an input port the interface 22 may be a high definition multimedia interface (HDMI) port or a USB port to physically connect (e.g. using a wired connection) to another CE device.

Continuing the description of the AVD 12, in some embodiments the AVD 12 may include one or more cameras 26 that may be, e.g., a thermal imaging camera, a digital camera such as a webcam, and/or a camera integrated into the AVD 12 and controllable by the processor 18 to gather pictures/images and/or video in accordance with present principles, including reflections of light from the display surface generated by a pointer 28 such as a laser pointer.

Still referring to FIG. 1, in addition to the AVD 12, the system 10 may include one or more other CE device types such as the control device 24 to send computerized presentation information to the AVD 12 via commands sent directly to the AVD 12 and/or through the below-described server.

The example non-limiting control device 24 may be established by any one of the above-mentioned devices, for example, a portable wireless laptop computer or notebook computer or game controller (also referred to as "console"), and accordingly may have one or more of the components described below. The control device 24 may include one or more displays 30 that may be touch-enabled for receiving user input signals via touches on the display. The control device 24 may include one or more input devices 32 such as, e.g., an audio receiver/microphone, keyboard or keypad, mouse, etc. for e.g. entering commands to the control device 24. The example control device 24 may also include one or more network interfaces 34 for communication over a network with the AVD 12 and may use the same protocol as used by the AVD 12 in implementing information exchange over the input port 22. A processor 36 accessing computer storage 38 controls the control device 24 to undertake present principles. In some embodiments the control device 24 may include one or more cameras 40 to image the display surface.

The devices 12, 24 may communicate with one or more network servers 42 including one or more server processors 44, one or more computer storages 46, and one or more network interfaces 48. In some embodiments the server 42 may be an Internet server or an entire server "farm" and may include and perform "cloud" functions such that the devices of the system 10 may access a "cloud" environment via the server 42 in example embodiments for, e.g., network gaming applications.

Either or both of the processors shown in FIG. 1 may execute a machine learning (ML) engine to learn "unimportant" slide areas on which to overlay images. Without limitation, the ML engine may be implemented by one or more of perceptrons, recurrent neural networks (RNN), long short-term memories (LSTM), convolution neural networks (CNN), gated recurrent units (GRU), and combinations thereof. The ML engine may be trained on a dataset containing, for example, examples of banners, background images, and other content deemed to be "unimportant" for present purposes. The ML engine also may be trained on a dataset containing, for example, content deemed to imply "importance", such as changing content or certain classes of content. The ML engine may be further refined using subsequent user input that corrects decisions output by the ML engine as to where to overlay images onto slides. Additional principles of training and using the ML engine are set forth below.

Figure 2:
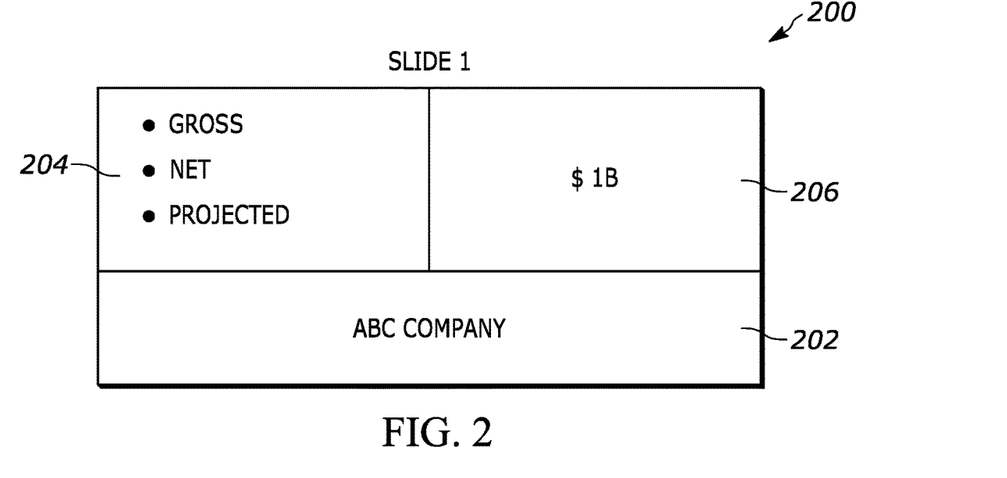
FIGS. 2-4 illustrate a series of slides of a computerized presentation in which a presenter's image is overlaid onto parts of the slides.
Figure 3:
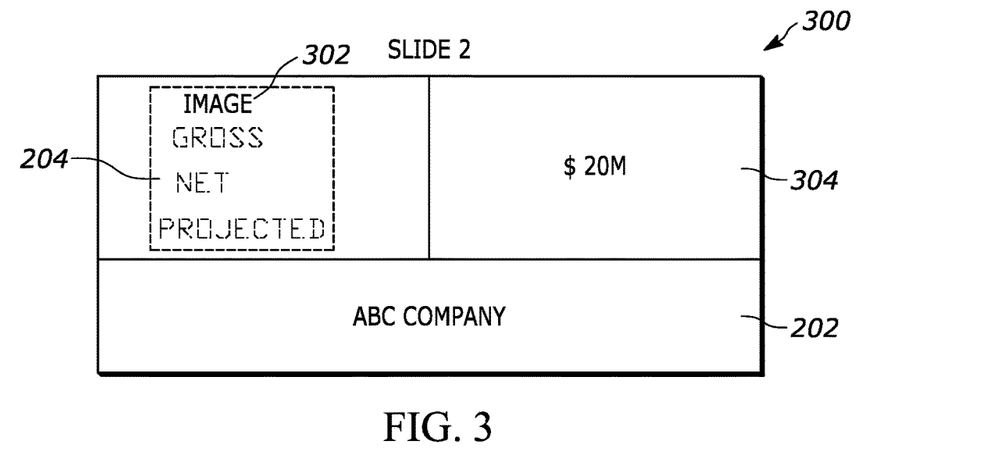
Figure 4:
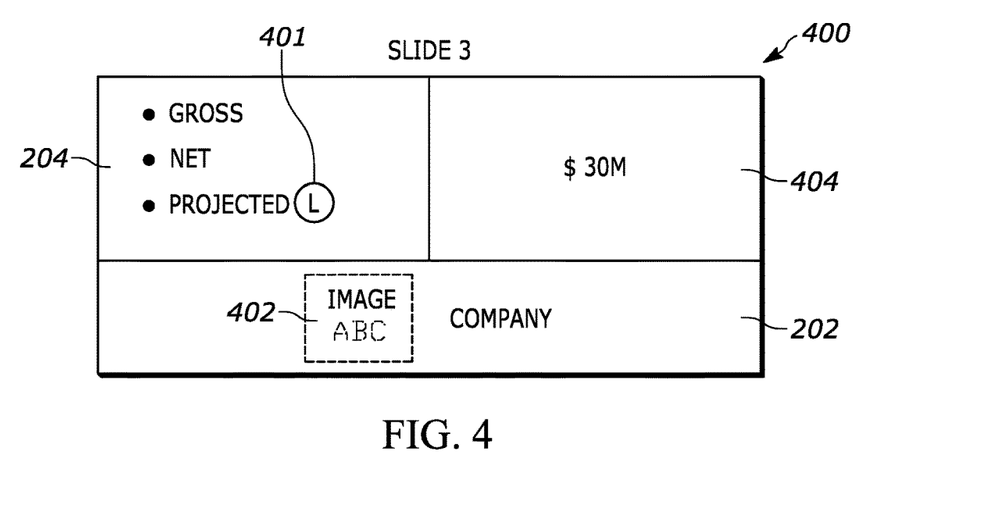

FIGS. 2-4 illustrate overlaying images such as an image of a presenter onto areas of elements of a computerized presentation such as slides of a slide presentation. FIG. 2 illustrates a first slide 200 in a presentation in which a horizontally elongated banner 202 appears in the lowest region of the slide. A substantially square left region of the slide 200 contains an area 204 of alpha-numeric information, in the example shown, "gross", "net", and "projected". A substantially square right region of the slide 200 contains an area 206 that shows a numeral representing, in the example shown, a gross sales figure.

FIG. 3 shows a second slide 300 that, like the first slide 200, contains the banner 202 and area 204 of alpha-numeric information, with the content of both areas 202, 204 being substantially identical to each other (allowing for minor departures in size or color owing to visual or other artifacts). As logic described further below explains, because both areas 202, 204 do not change between the first slide 200 and the second slide 300, both are candidates for overlaying an image 302 such as an image of the presenter onto the area. Note that the banner area 202 in the first slide 200 occupies substantially the same geometric region of the first slide 200 as it occupies in the second slide 300 (but for no or minor differences), and likewise the left hand area 204 of the first slide 200 occupies substantially the same geometric region of the first slide 200 as it does in the second slide 300.

In the example shown, because the square left hand area 204 most closely matches the original size and/or aspect ratio of the image 302 than does the banner area 202, the image 302 is re-sized as necessary to fit within the left and area 204 and then overlaid onto the area 204. This partially or completely obscures the content in the area 204 as indicated by the dashed lines forming the words "gross", "net", and "projected".

In contrast, the right-hand area 304 of the second slide 300 contains different content than the right-hand area 206 of the first slide 300, namely in the example a numeric figure indicating net sales. For this reason, the right-hand area 304 of the second slide 300 is not a candidate for having the image 302 overlaid onto it.

FIG. 4 illustrates a third slide 400 which contains the same left-hand area 204 and banner area 202 as the first and second slides 200, 300. However, as indicated at 401, one of the cameras shown in FIG. 1 detects, on the display surface, light from a pointer such as the laser pointer 28. Note that the laser light is not on the slide 400 itself but rather on a region of a display of the slide 400 on the display surface that corresponds to the left-hand area 204 at the location illustrated. For this reason, which implies that the left-hand region 204 is of importance to the presentation and thus should not be obscured, the image is modified in size and aspect ratio and overlaid at 402 onto all or a portion of the banner area 202. In the specific example shown the image 402 is overlaid onto the "ABC" in the banner area 202 as indicated by the dashed lines. In contrast, the right-hand area 404 of the third slide 400 contains different content than the right-hand areas of the first and second slides, namely in the example a numeric figure indicating projected sales. For this reason, the right-hand area 404 of the third slide 400 is not a candidate for having the image 402 overlaid onto it.

Figure 5:
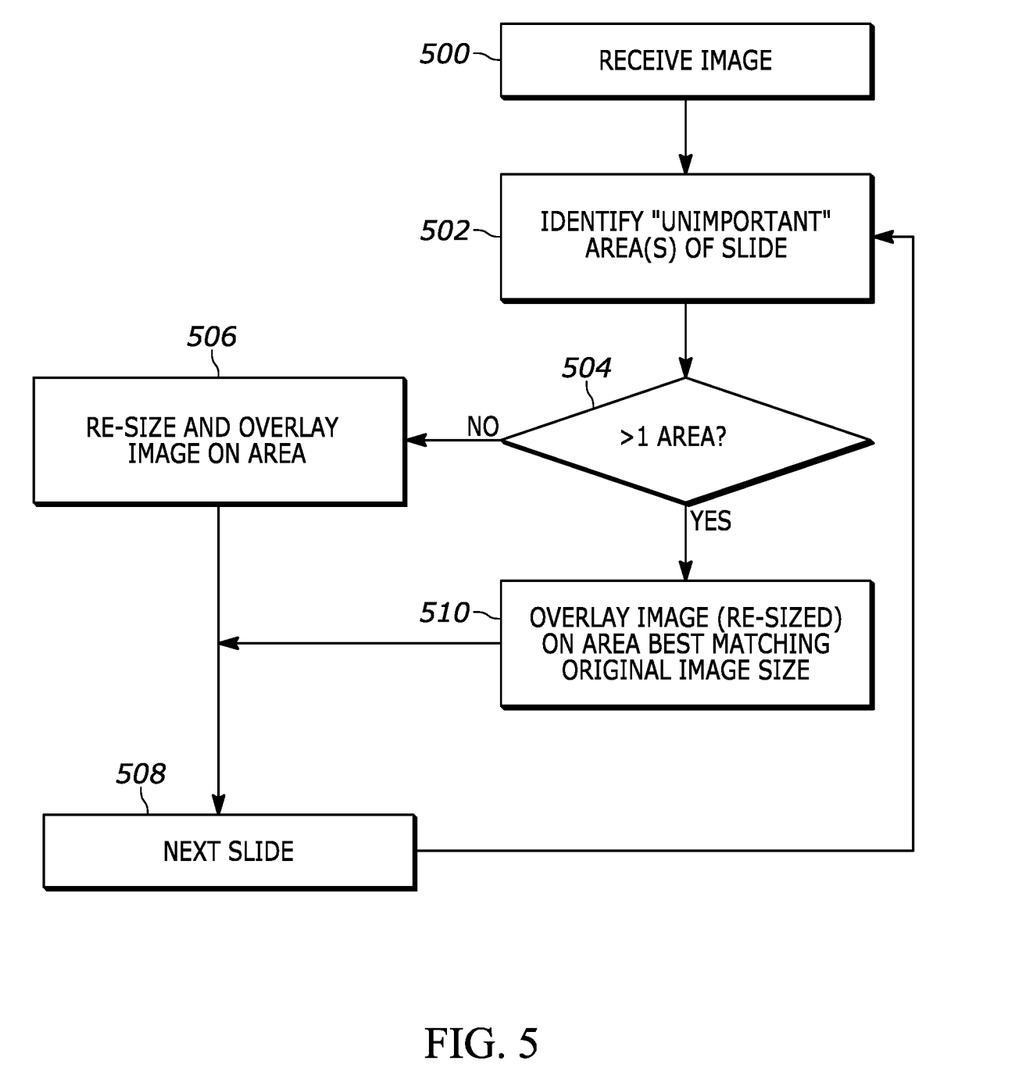
FIG. 5 is a flow chart of example logic consistent with present principles.

FIG. 5 illustrates logic related to FIGS. 2-4. Commencing at block 500, an image such as the image 302 is received. Moving to block 502, one or more areas of a slide are identified as being "unimportant" and thus candidates for having the image overlaid onto them. In examples, unimportant areas are identified based on being banner areas, areas in which the content remains the same slide to slide, background images either learned as such by a machine learning engine or other data that is common between multiple slides, etc. Note that in the event that no "unimportant" area is identified, the image may be minimized, e.g., by shrinking the image to a very small size and placing the image in a tool tray or other area of projection or other display.

Moving to decision diamond 504, it is determined whether more than one "unimportant" area is identified. If not, the logic moves to block 506 to re-size and if desired re-configure the image (e.g., modify the aspect ratio of the image) to fit within the area identified at block 502. The modified image is then overlaid onto the area identified at block 502. The next slide is retrieved at block 508 and the logic loops back to block 502 to identify "unimportant" areas in the next slide, such as unchanged areas in the next slide relative to the preceding slide.

On the other hand, if at decision diamond 504 it is determined that more than one "unimportant" area is identified, the logic may proceed to block 510 to select the "unimportant" area most closely matching, in size and aspect ratio, the size and/or aspect ratio of the image. The image is re-sized and re-configured as appropriate to fit within the selected area and then overlaid onto the selected area. From block 510 the logic moves to block 508 to retrieve the next slide. Thus, the process of deciding where to overlay the image is dynamic depending on what slide the presenter next shows.

Figure 6:
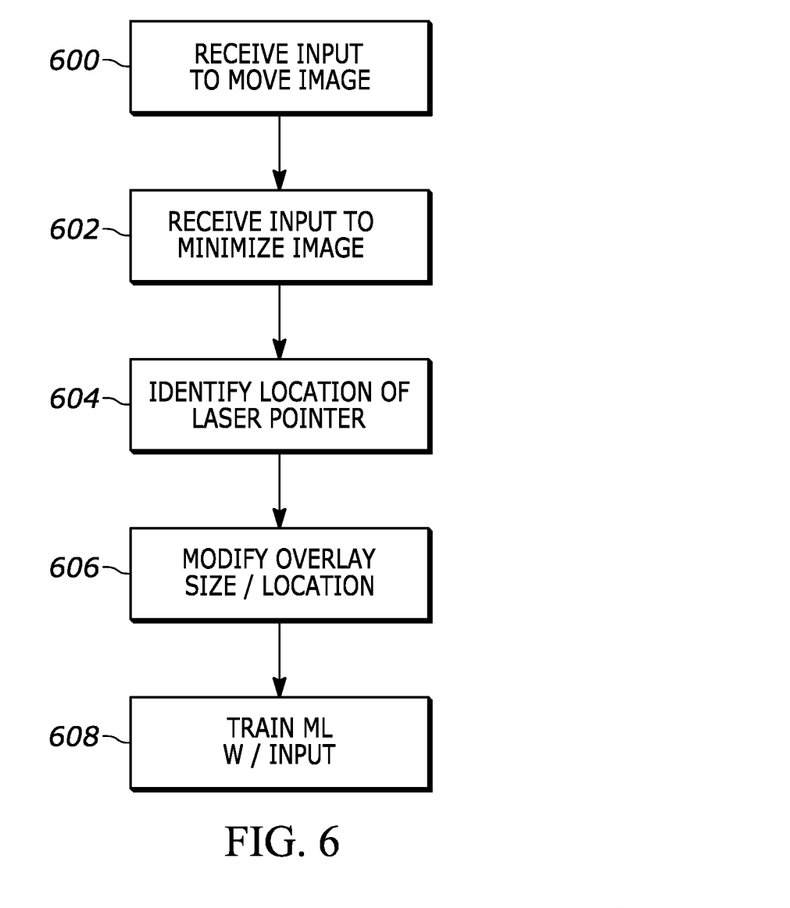
FIG. 6 is a flow chart of additional example logic consistent with present principles.

FIG. 6 illustrates logic in which various types of user input are received to alter a location at which the modified image is presented, to both move or minimize the image and to further train the ML engine for reinforcement learning of the ML engine for presenting images in slides. Block 600 indicates that one such type of user input is a drag and drop or other user input to move the image from the area selected by the logic to another area. The content in the new area is thus impliedly less important than the content in the original area.

Block 602 indicates that another type of user input is to minimize the image. This indicates that all content of the slide being shown is considered important. Yet again, block 604 indicates that light from a laser pointer is detected on a display surface at a location corresponding to an area in a slide, indicating that content in that area is important.

Proceeding to block 606, the image is modified in size and location of overlay and then overlaid onto an "unimportant" area of a slide. The ML engine receives, at block 608, the above inputs for further learning. For example, the ML engine may be trained to learn text as being correlated to an area in which the modified image is to be overlaid. Or, the ML engine may be trained to correlate metadata associated with the computerized presentation to identify an area in which the modified image is to be overlaid.

Figure 7:
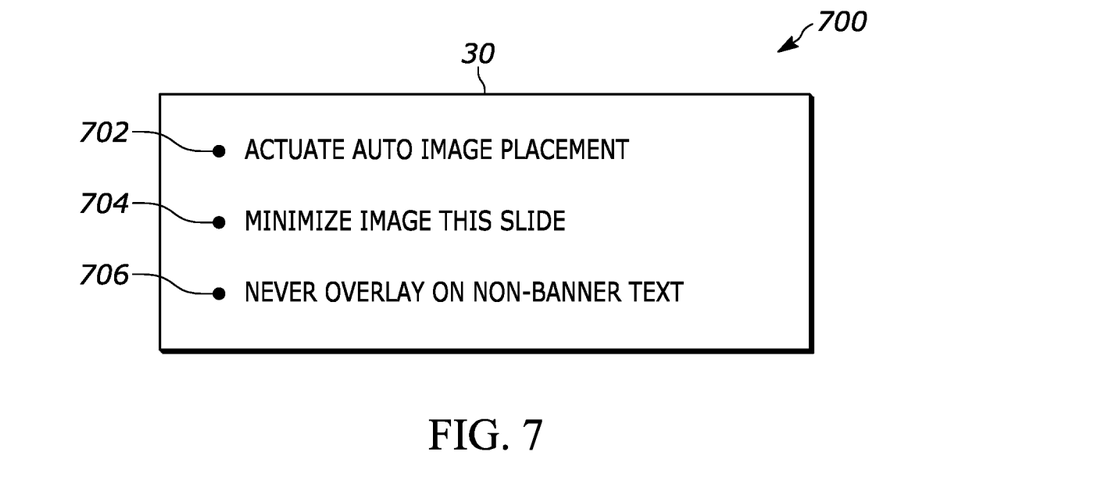
FIG. 7 is a screen of an example user interface (U) consistent with present principles.

FIG. 7 illustrates yet another means for deciding whether and where to overlay images onto computerized presentations and for training the ML engine. A UI 700 may be presented on the display 30 of the control device 24 shown in FIG. 1 which includes a selectable element 702 to activate or de-activate automatic image overlay as described above. A selector 704 may be provided to minimize the image for the current slide only. Also, a selector 706 may be provided to identify specific content over which no image ever is to be overlaid, in the example shown, non-banner text, enabling the user to input to the ML engine an example of "important" content.

It will be appreciated that whilst present principals have been described with reference to some example embodiments, these are not intended to be limiting, and that various alternative arrangements may be used to implement the subject matter claimed herein.

What is claimed is:

1. A device comprising:
at least one processor configured with instructions to:
identify that content in a first area in a first slide of a computerized presentation is substantially identical to content in a second area of a second slide of the computerized presentation, the first and second areas respectively occupying substantially a same geometric region of the first and second slides, the content being visual alpha-numeric content, graphical content, or both alpha-numeric and graphical content;
modify an image to fit within the second area of the second slide to render a modified image;
overlay the modified image into the second area of the second slide;
identify a region of a projected slide as containing pointer light; and
responsive to identifying the region of the projected slide as containing pointer light, not overlay the modified image into an area of the slide corresponding to the region.

2. The device of claim 1, wherein the instructions are executable to:
identify where to overlay the modified image depending on what slide is to be next shown.

3. The device of claim 1, wherein the at least one processor is implemented in a slide projector.

4. The device of claim 1, wherein the instructions are executable to:
receive input to alter a location at which the modified image is presented; and
enter the input into a machine learning (ML) engine for reinforcement learning of the ML engine for presenting images in slides.

5. The device of claim 1, wherein the instructions are executable to:
responsive to identifying that content in the first slide is not substantially identical to content in the second slide, minimize the image to render a minimized image; and
overlay the minimized image onto the second slide.

6. The device of claim 1, wherein the instructions are executable to:
train a machine learning (ML) engine to learn text as being correlated to an area in which the modified image is to be overlaid.

7. The device of claim 4, wherein the instructions are executable to:
train the ML engine to correlate metadata associated with the computerized presentation to identify an area in which the modified image is to be overlaid.

8. The device of claim 1, wherein the instructions are executable to:
move overlay of the modified image on a third slide relative to the second slide and/or re-size the modified image on the third slide relative to the second slide based at least in part on content of the third slide.

9. A computerized method, comprising:
identifying at least a first area of a first computerized presentation element as being a candidate for having an image overlaid thereon, the first area being a subset of an area of the first presentation element; and
responsive to identifying the first area of the first computerized presentation element as being a candidate for having an image overlaid thereon, overlaying an image on the first area, wherein the method further comprises:
identifying a region of a projected slide as containing pointer light; and
responsive to identifying the region of the projected slide as containing pointer light, not overlaying the image into an area of the first presentation element corresponding to the region.

10. The method of claim 9, wherein the identifying is based at least in part on identifying that content in the first area of the first presentation element is the same as content in a corresponding area of a previous presentation element.

11. The method of claim 10, comprising re-sizing and/or re-configuring the image prior to overlaying the image onto the first presentation element.

12. The method of claim 11, comprising moving a location of the image on a second presentation element relative to the first area on the first presentation element based at least in part on content in the second presentation element.

13. The method of claim 9, wherein the first presentation element comprises a slide.

14. The method of claim 9, comprising:
receiving input to alter a location at which the modified image is presented; and
entering the input into a machine learning (ML) engine for reinforcement learning of the ML engine for presenting images in slides.

15. The method of claim 9, comprising:
identifying at least the first area of the first computerized presentation element as being a candidate for having an image overlaid thereon based at least in part on identifying the first area as containing text.

16. An apparatus, comprising:
at least one processor programmed with instructions to:
discover content that is common between multiple slides, the content being alpha-numeric, graphical, or both alpha-numeric and graphical;
based at least in part on discovering content that is common between multiple slides, automatically relocate, or resize, or relocate and resize at least one image from a camera on a slide by slide basis to areas of non-critical content;
identify a region of a projected slide as containing pointer light; and
responsive to identifying the region of the projected slide as containing pointer light, not overlaying an image into an area of a slide corresponding to the region.

17. The apparatus of claim 16, wherein the instructions are executable to:
train at least one machine learning (ML) engine for reinforcement learning of the ML engine for determining where to overlay images onto slides based at least in part on relocation of the image on a slide.

18. The apparatus of claim 16, wherein the instructions are executable to:
move overlay of an image on a first slide relative to a preceding slide and/or re-size the image on the first slide relative to the preceding slide based at least in part on content of the first slide.

* * * * *